March 15, 1927.
C. W. MANZEL
1,620,824
LUBRICATING GUN
Filed June 16, 1921
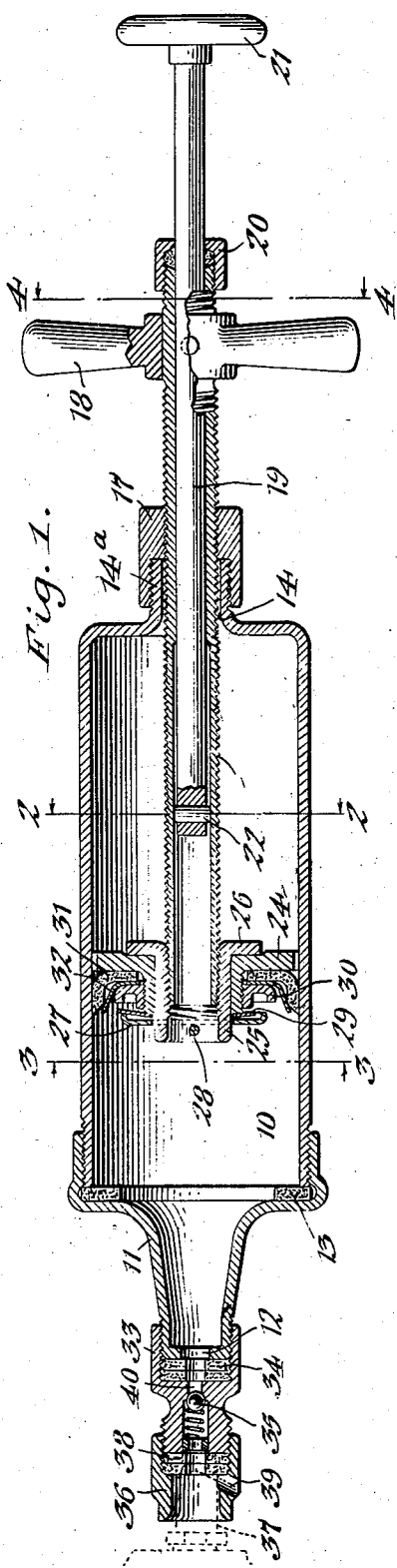
Inventor,
Charles W. Manzel,
by Geyer Dopp
Attorneys.

Patented Mar. 15, 1927.

1,620,824

UNITED STATES PATENT OFFICE.

CHARLES W. MANZEL, OF BUFFALO, NEW YORK, ASSIGNOR TO THE BASSICK MANUFACTURING COMPANY, OF CHICAGO, ILLINOIS, A CORPORATION OF DELAWARE.

LUBRICATING GUN.

Application filed June 16, 1921. Serial No. 477,959.

This invention relates to a lubricating gun or pump intended more especially for supplying oil or grease to the various bearings of automotive vehicles, although the same is equally applicable to the bearings of various other mechanisms.

One of the objects of this invention is to produce a high-pressure gun of this character which is simple and compact in construction, and which is capable of using oil or grease.

Another object is to construct the gun so as to expel or discharge a predetermined amount of lubricant upon a given stroke of the pump plunger.

A still further object is to provide a gun of this character which can be normally carried in any position without danger of leakage.

In the accompanying drawings:

Figure 1 is a longitudinal section of the gun. Figs. 2, 3 and 4 are cross sections thereof on the correspondingly numbered lines in Fig. 1.

Similar characters of reference indicate corresponding parts throughout the several views.

The body of the gun consists of a lubricant-receiving reservoir or magazine 10 which is preferably cylindrical and provided at its open front end with a removable screw cap 11 having a lubricant discharge passage 12 in its front end, as shown in Fig. 1. A packing gasket 13 may be arranged between said cap and the corresponding end of the magazine to prevent the leakage of lubricant between these parts.

Extending axially into the magazine and passing freely through an opening 14 in an externally-threaded neck 14ª formed at the rear end thereof is a pump barrel or cylinder 15 of relatively small diameter, which is adjustable lengthwise in said magazine and opens into the same. For this purpose, the cylinder is preferably provided with an external screw thread 16 which extends substantially its full length and which engages an internally-threaded nut 17 screwed onto the neck of the magazine. A suitable handle 18 is pinned or otherwise secured to the rear end of the cylinder for conveniently effecting rotation thereof in either direction and imparting a corresponding longitudinal movement of said cylinder relatively to the magazine. Sliding in the cylinder is a plunger 19, its rear end passing through a stuffing box or nut 20 threaded on the extreme rear end of said cylinder. The external rear portion of this plunger serves as an operating rod and is provided with a convenient knob or handle 21 by which the forward and return strokes of said plunger are effected. The forward or effective stroke of the plunger is limited by its handle abutting against the nut 20, while its return stroke is limited by a stop pin 22 thereon abutting against an internal shoulder 23 formed in the cylinder 15.

Mounted on the front end of said cylinder and movable lengthwise therewith in the magazine 10 is a piston 24. To permit the cylinder to rotate independently of the piston and insure ease of operation of the latter in said magazine, the piston is preferably mounted on a sleeve or swivel bearing 25 secured to the front end of the cylinder by a screw-threaded connection, or otherwise, as shown in Fig. 1. The piston is held against longitudinal movement on its swivel bearing by means of a flange 26 arranged at the rear end of the latter and at its front end by a washer 27 held on said swivel bearing by a cotter pin 28. A flat spring washer 29 interposed between said washer 27 and the opposing end of the piston normally tends to hold the latter against the flanged rear end of the swivel bearing and form a fluid-tight joint between these parts. Arranged between the front face of the piston and a nut 30 threaded on the stem thereof is a cup packing 31 of any appropriate material. As shown in Figs. 1 and 3, a spring washer 32, confined between the piston and said packing nut, is provided which constantly tends to hold the flanged portion of the piston packing snugly and tightly against the inner wall of the magazine to insure against leakage of the lubricant past the piston.

The delivery or discharge end of the gun may be of any suitable construction, but as shown in the drawings, the same is preferably provided with a discharge nipple 33 screwed or otherwise secured to the front end of the cap 11, a packing washer 34 being arranged between said parts. This nipple contains a spring-pressed check valve 35 which closes toward said cap to prevent the entrance of air and dust and the escape of lubricant from the magazine when the gun is not in use. Screwed or otherwise secured to the nipple is a forwardly-projecting guide nozzle or socket 36 which is adapted to fit over a feed nipple 37 carried by a bearing to be lubricated. This guide nozzle is provided with a packing washer or gasket 38 of rubber or other appropriate material to form a reliable lubricant-tight seal between the feed nipple and the guide nozzle of the gun.

In order to prevent grease from lodging in the bottom of the guide nozzle 36 and remaining there, a relief-passage 39 is arranged in the side thereof substantially in line with the engaging face of the packing washer 38. By this provision, should there be any grease deposited in the bottom of the guide nozzle, the same will be expelled therefrom through the relief passage upon the gun being placed in position over the feed nipple 37, thus insuring a tight joint between the latter and said guide nozzle at all times and preventing loss of pressure.

To fill the magazine 10 with a lubricant, such as grease, the discharge nipple 33 is unscrewed from the cap 11, and the piston is then drawn back against the rear end of said magazine, this being accomplished by unscrewing the nut 17 from the neck 14 and sliding the cylinder rearwardly through the latter, after which the nut is screwed back on said neck to hold the cylinder against longitudinal displacement, and at the same time restore these parts in position ready for operation. The cap 11 is then unscrewed from the magazine and the latter filled in an obvious manner. Having thus filled the magazine to its capacity, the screw cap is applied thereto, after which said magazine is vented to remove any air pockets which might be present in the grease contained therein. This removal of air from the grease is effected by turning the cylinder 15 in the proper direction to move the piston 24 forwardly in the magazine, which movement forces the grease into the cap 11, the air being expelled through the passage 12 in said cap. This operation is continued until a solid column of grease is seen to discharge through said passage, after which the discharge nipple and its guide nozzle are applied to the screw cap. The gun is now ready for lubricating bearings.

In lubricating a bearing with grease, the gun is joined to the bearing nipple 37 by passing the guide nozzle 36 over the nipple, as shown at the left in Fig. 1, the body of the gun serving as a handle for this purpose. After moving the plunger 19 to the rear end of the cylinder 15, the latter is rotated in a direction to advance the piston 24, this movement forcing the grease from the magazine into the cylinder owing to the difference in areas between the latter and the valve-controlled inlet passage 40 of the discharge nipple. When the cylinder is filled with grease, which condition can be detected by the increased resistance offered to the turning of the cylinder handle 18, said plunger is pushed forwardly to deliver the charge into the bearing, the full charge expelled being equal to the amount contained in said cylinder. The pressure exerted against the plunger handle and gun body is transmitted to the packing gasket 38 which is thereby held firmly against the end of the feed-nipple, producing a tight and reliable seal between these parts and insuring the delivery of a full charge into the bearing. After expelling the charge, the plunger is drawn back to the limit of its stroke, and the cylinder recharged in the manner previously described, ready for lubricating another bearing.

The magazine is of sufficient capacity to contain enough grease for lubricating an automobile several times, and a single charge in the cylinder is usually sufficient for thoroughly lubricating a bearing.

In lubricating a bearing with oil, the operations are substantially the same as those described for using grease.

This improved lubricating gun is very simple and compact in construction and by the arrangement of the longitudinally adjustable cylinder and piston together with the slidable plunger, it is possible to obtain a high pressure with a minimum effort.

I claim as my invention:

1. A compressor for supplying lubricant under pressure to a lubricant receptacle comprising a barrel provided with a rigid discharge conduit, having means at its free end for making a tight joint with said lubricant receptacle, a piston in said barrel for placing an initial pressure upon the lubricant contained therein, a second piston for increasing the pressure on the lubricant in said barrel and conduit, and a valve for controlling the passage of lubricant through said discharge conduit, the aforementioned parts being so arranged relatively to each other that when pressure is exerted upon said second piston in a direction lengthwise of said compressor, the lubricant in said barrel and discharge conduit will be placed under increased pressure, said joint will be established, and said valve opened.

2. A compressor for supplying lubricant under pressure to a lubricant receptacle comprising a barrel provided with a rigid discharge conduit, a spring-pressed valve for controlling the flow of lubricant through said conduit, said conduit having means at its free end for making a tight joint with said lubricant receptacle, a piston in said barrel for placing an initial pressure upon the lubricant contained therein, a second piston for increasing the pressure upon the lubricant in said barrel, the aforementioned parts being so arranged relatively to each other that when pressure is exerted upon said second piston in a direction lengthwise of said compressor the lubricant in said barrel will be placed under increased pressure, said joint will be established, and said valve opened.

3. A compressor for supplying lubricant under pressure to a lubricant receptacle comprising a barrel having a cylinder communicating therewith, a piston in said barrel for placing the lubricant therein under an initial pressure, a second piston in said cylinder for increasing the pressure on said lubricant, a rigid conduit for conducting the lubricant under said increased pressure to said receptacle, and for making a tight joint therewith, the aforementioned parts being so arranged relatively to each other that a single force applied to said compressor will place the lubricant in said barrel under increased pressure and effect a tight joint with said receptacle, and means actuated by said single force for controlling the passage of lubricant through said discharge conduit.

4. A portable lubricant pump comprising a barrel having a discharge conduit at one end provided with an outwardly opening check valve, a spring for holding said valve in its closed position, an elongated externally threaded cylinder threaded through the opposite end of said barrel, said cylinder being of smaller diameter than said barrel, means at the outer end of said cylinder whereby it can be rotated, an annular piston carried by the inner end of said cylinder and having sealed sliding contact wtih the inner walls of said barrel, a rod slidably mounted in said cylinder and having one end projecting outwardly beyond the outer end of said cylinder, the outer end of said cylinder being provided with means for preventing the leakage of lubricant along said rod, said spring having sufficient tension to offer perceptible resistance to the opening of said valve.

5. A portable lubricant pump comprising a barrel having a discharge conduit at one end, an elongated externally threaded cylinder threaded through the opposite end of said barrel, said cylinder being of smaller diameter than said barrel, means whereby said cylinder can be rotated, an annular piston carried by the inner end of said cylinder and having sealed sliding contact with the inner walls of said barrel, a rod mounted in said cylinder and having one end projecting outwardly beyond the outer end of said cylinder, said pump comprising means for yieldingly opposing the flow of lubricant from said barrel to increase the resistance to the turning of said cylinder so as to indicate to the operator when said cylinder is substantially filled.

6. A portable lubricant pump comprising a barrel having a discharge conduit communicating with one end thereof, an elongated externally threaded cylinder threaded through the opposite end of said barrel, an annular piston rotatably mounted on the inner end of said cylinder and having sealed sliding contact with the inner walls of said barrel, and means slidably mounted in said cylinder for expelling lubricant therefrom, said pump comprising means for yieldingly opposing the flow of lubricant from said barrel to increase the resistance to the turning of said cylinder so as to indicate to the operator when said cylinder is substantially filled.

7. A portable lubricant pump comprising a barrel having a discharge conduit communicating with one end thereof, an elongated externally threaded cylinder threaded through the opposite end of said barrel, an annular piston rotatably mounted on the inner end of said cylinder and having sealed sliding contact with the inner walls of said barrel, means slidably mounted in said cylinder for expelling lubricant therefrom, and self-contained means for enabling the operator to fill said cylinder from said barrel by rotating said cylinder.

8. A portable lubricant pump comprising a barrel having a discharge conduit communicating with one end thereof, an annular piston in said barrel, a hollow cylinder carrying said piston and projecting through the opposite end of said barrel, means for causing said piston to move in said barrel upon rotation of said cylinder, a piston rod slidable in said cylinder, and an outwardly opening spring-retarded check valve in said discharge conduit for causing the inward movement of said piston to fill said cylinder.

9. A portable lubricant pump comprising a barrel having a discharge conduit communicating with one end thereof, an annular piston in said barrel, a hollow cylinder carrying said piston and projecting through the opposite end of said barrel, means for causing said piston to move in said barrel upon rotation of said cylinder, a piston rod slidable in said cylinder, and self-contained means for causing the inward movement of said piston to fill said cylinder from said barrel.

10. A portable lubricant pump comprising a barrel having a discharge conduit communicating with one end thereof, an elongated externally threaded cylinder threaded through the opposite end, an annular piston carried by the inner end of said cylinder, a rod slidable in said cylinder and free to move without restraint in an outward direction, and self-contained means for yieldingly resisting the flow of lubricant through said discharge conduit.

11. A lubricating gun, comprising a magazine, a discharge nipple attached to the front end of said magazine and having a guide nozzle adapted to fit over the feed nipple of a bearing, said nozzle having a lubricant relief passage in its side, and means for expelling the lubricant from said magazine.

CHARLES W. MANZEL.